United States Patent [19]

Johnson, Sr.

[11] Patent Number: 4,682,462
[45] Date of Patent: Jul. 28, 1987

[54] SWATHER WITH SWINGING HITCH

[76] Inventor: Gerald T. Johnson, Sr., R.R. Box 76, Kulm, N. Dak. 58456

[21] Appl. No.: 784,237

[22] Filed: Oct. 4, 1985

[51] Int. Cl.⁴ ............................................. A01B 73/00
[52] U.S. Cl. ...................................... 56/228; 172/386; 172/383; 280/415 R; 56/192; 56/149
[58] Field of Search .................. 56/228, 11.9, 14.9, 56/15.1, 15.2, 15.5, DIG. 11, 192; 172/383, 384, 386, 245, 248; 280/415 R, 444, 445

[56] References Cited

U.S. PATENT DOCUMENTS

| | | | |
|---|---|---|---|
| 4,366,664 | 1/1983 | Penner et al. | 56/15.2 |
| 4,455,034 | 6/1984 | de Graff et al. | 56/228 |
| 4,460,193 | 7/1984 | Dietz | 56/228 |
| 4,573,309 | 3/1986 | Patterson | 56/228 |

FOREIGN PATENT DOCUMENTS 53432  1/1967  German Democratic Rep. .................................. 172/386

Primary Examiner—Gene Mancene
Assistant Examiner—John G. Weiss
Attorney, Agent, or Firm—Harvey B. Jacobson

[57] ABSTRACT

A pull type swather is provided with an adjustable hitch assembly for converting the swather as between a field position in which it is pulled widthwise by a tractor and a transport position in which it is pulled substantially lengthwise. The hitch assembly comprises a hitch pole pivotally connected to the swather frame, a telescopic assembly pivotally connected between the swather frame and the hitch pole and a hydraulic cylinder for extending and retracting the telescopic assembly so as to change the angle of the hitch pole as between the field and transport positions. The swather also includes pivotal wheel assemblies movable by separate hydraulic cylinders as between field and transport wheel positions. The respective hydraulic cylinders are connected in series in a hydraulic circuit for least-resistance sequence operation when converting the apparatus as between the field and transport configurations. The apparatus allows for effortless conversion as between the field and transport configurations.

11 Claims, 13 Drawing Figures

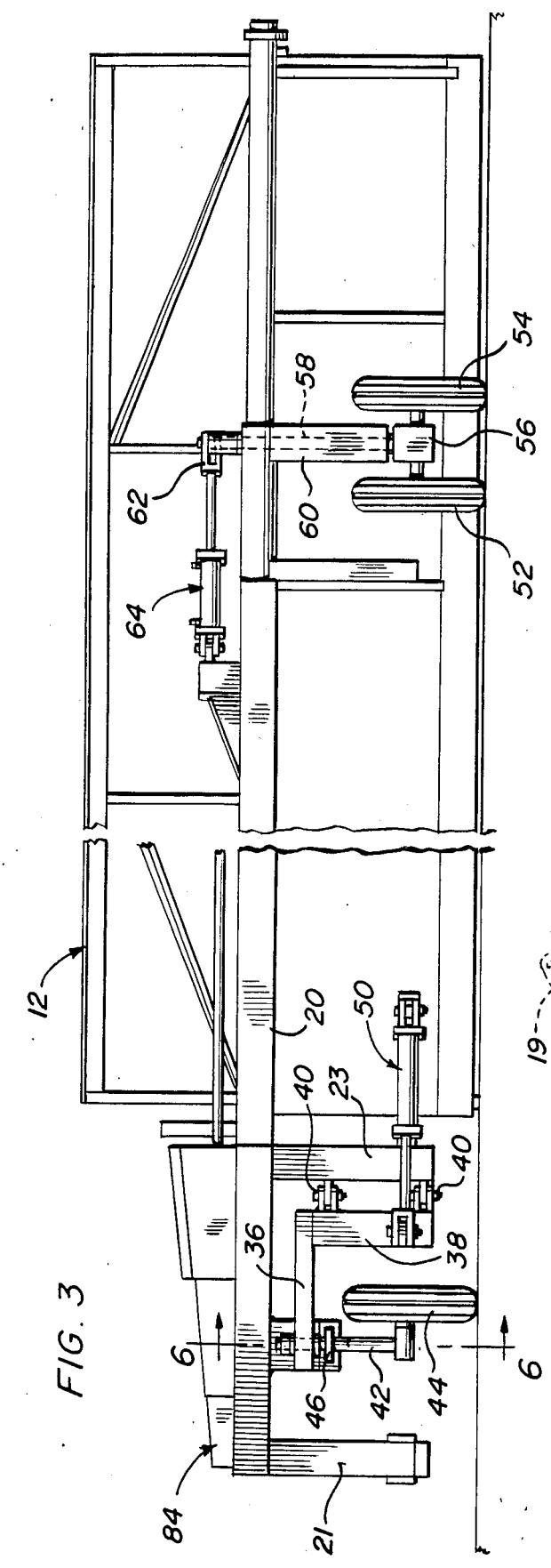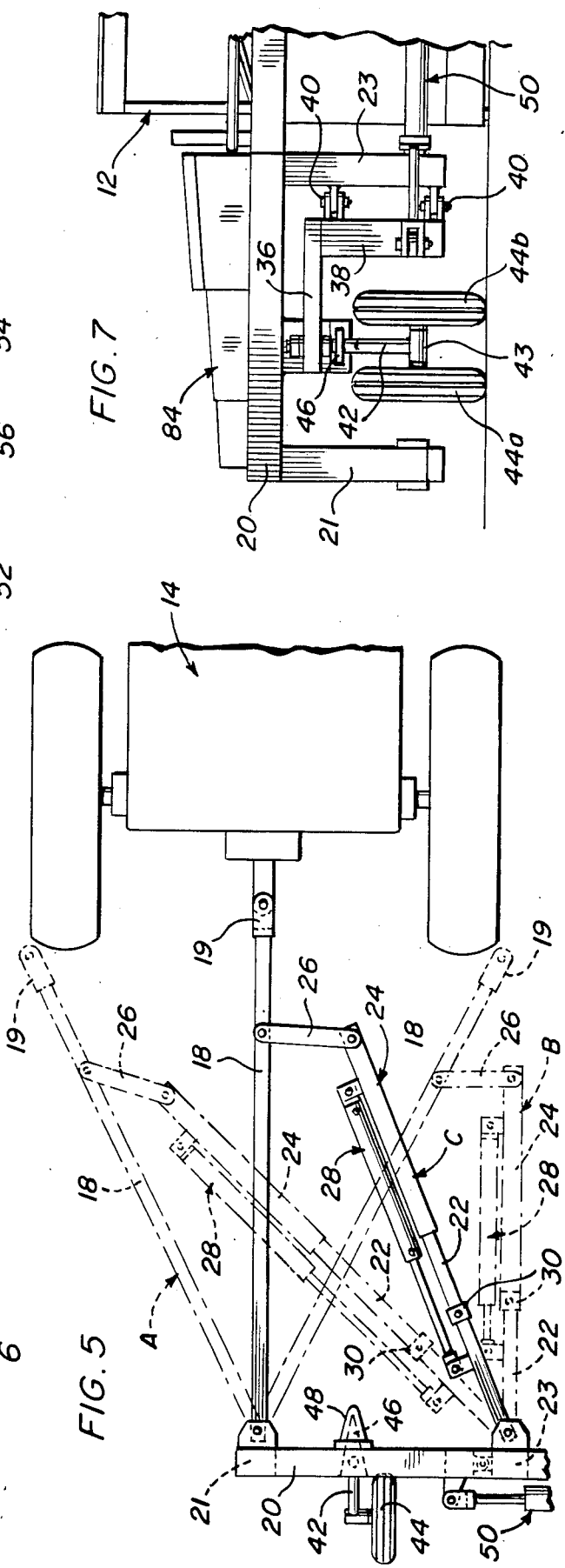

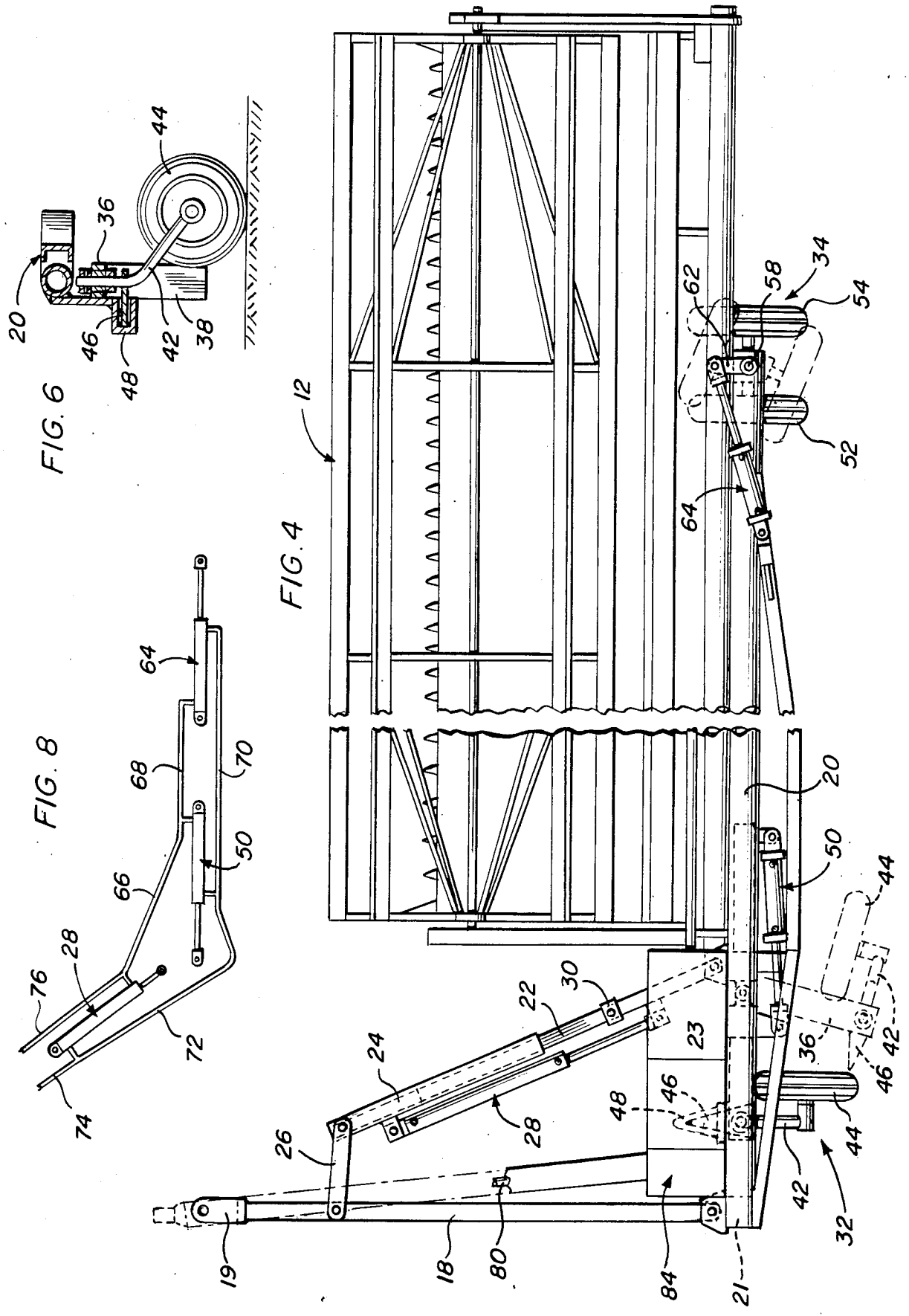

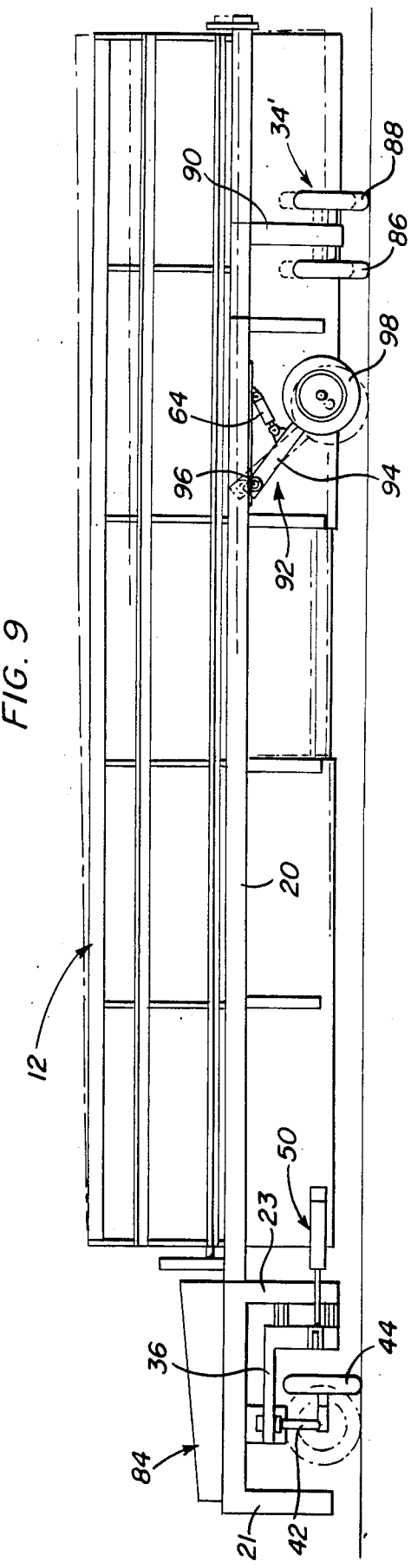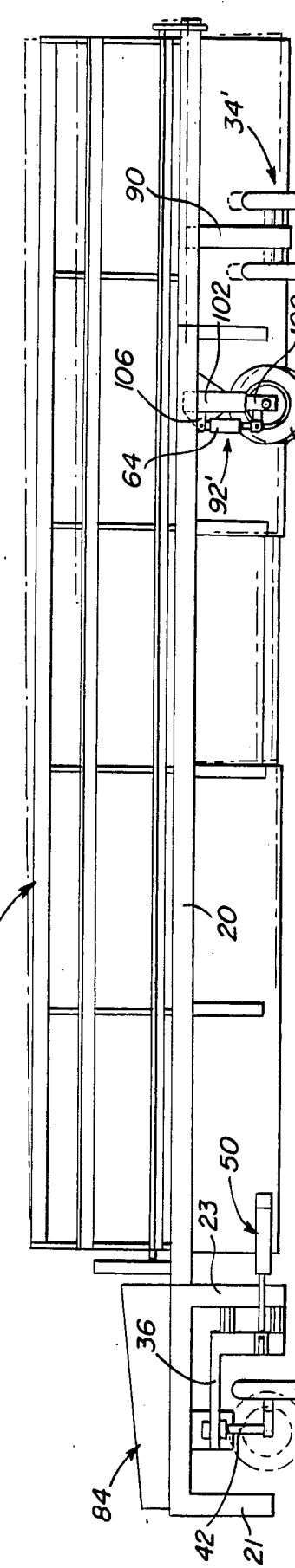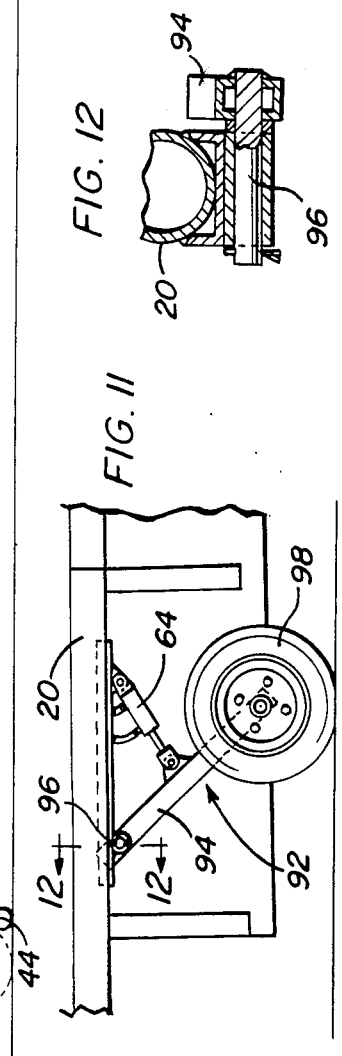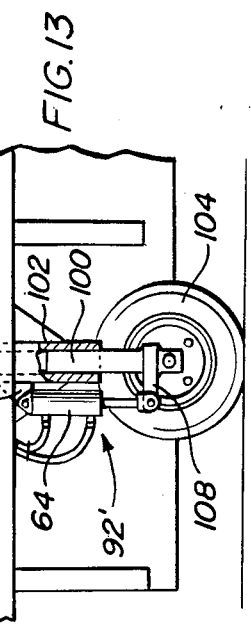

SWATHER WITH SWINGING HITCH

BACKGROUND OF THE INVENTION

This invention relates to farm equipment in general, and to pull-type swathers in particular. Swathers commonly have a relatively long swather reel mounted on a wheeled frame which, during use in a field, is towed transversly to the reel axis by a tractor or like towing vehicle attached to the frame by a hitch or the like usually at one end of the frame. The overall width of a swather, however, generally prevents it from being towed in this widthwise manner through farm gates, along roads or the like, for transportation, for example from one field location to another. Accordingly, it is common practice to change the relative positions of the tractor and swather frame for transportation purposes to enable the tractor to tow the swather frame and reel lengthwise rather than widthwise.

Various systems have been proposed for changing the relative positions of a tractor and swather as between the widthwise and lengthwise towing configurations. In general, however, these systems tend to be complex, time consuming or involve other disadvantages.

DISCLOSURE STATEMENT

Applicant is aware of the following U.S. patents, the relevance of which is that they relate to adjustable swather hitch and like arrangements. None of the patents, however, discloses an apparatus having the features of the present invention.

| U.S. Pat. No. 2,470,842 | R.W. Barrington | 5-24-49 |
| U.S. Pat. No. 2,982,363 | R. Sweet et al. | 5-2-61 |
| U.S. Pat. No. 4,037,395 | Henkensiefken et al. | 7-26-77 |
| U.S. Pat. No. 4,186,806 | Ward | 2-5-80 |
| U.S. Pat. No. 4,204,699 | Gustafson | 5-27-80 |
| U.S. Pat. No. 4,442,662 | Jennings | 4-17-84 |
| U.S. Pat. No. 4,455,034 | de Graff et al. | 6-19-84 |
| U.S. Pat. No. 4,460,193 | Dietz et al. | 7-17-84 |

SUMMARY OF THE INVENTION

It is an object of the invention to provide a form of adjustable hitch assembly for a pull-type swather which allows the relative positions of a swather and a towing vehicle to be quickly and effectively adjusted as between a field position and a transport position with the minimum of operator effort.

Another object of the invention is to provide an adjustable hitch arrangement as aforesaid which automatically locks the swather wheels in a straight away position when the apparatus is in field position but which allows a forward one of the wheels to caster when the apparatus is in a transport position thereby facilitating steering of the swather.

A further object of the invention is to provide an adjustable hitch arrangement as aforesaid which provides the facility of multiple field positions of the towing vehicle relative to the swather.

In accordance with the invention, a swather is provided with an adjustable hitch assembly for the purpose indicated comprising a hitch pole pivotally connected at one end of the swather frame, the hitch pole having means for connection to a towing vehicle, a telescoping assembly pivotally interconnected between the swather frame and the hitch pole, a first hydraulic cylinder for providing telescopic extending and retracting movements of the telescoping assembly effective to adjust the angle of the hitch pole relative to the swather frame for changing the relative positions of the swather and a towing vehicle as between respective field and transport positions, a first movable wheel assembly on the swather frame adjacent said one end of the swather frame, a second hyraulic cylinder for moving the first wheel assembly between respective field and transport positions, a second movable wheel assembly adjacent the other end of the swather frame, and a third hydraulic cylinder for moving the second wheel assembly between respective field and transport positions. Importantly, the first, second and third hydraulic cylinders may be connected in series in a hydraulic circuit, which may be powered for example by a motor on the towing vehicle, so that when fluid is caused to flow through the circuit in one direction, the cylinders operate in low-resistance sequence to move the swather relative to the towing vehicle from the field position to the transport position and also to move the wheel assemblies from the respective field positions to the respective transport positions, while reverse flow of fluid through the circuit causes the cylinders to operate in low-resistance sequence to move the various components from the transport configuration of the apparatus to the field configuration.

Another important feature of the invention resides in the optional provision of a wheel locking mechanism for the wheel of the first wheel assembly which engages to lock the wheel in straight-ahead position when the apparatus is in field configuration but releases the wheel for castering when the apparatus is in transport configuration thereby facilitating steering. In a further aspect of the invention, the telescopic assembly may have means for restricting retracting movements thereof beyond a preselected position establishing a second field position for the apparatus.

The invention allows for simple and speedy conversion as between the respective field and transport configurations of the apparatus which can be accomplished in a matter of minutes directly from the towing vehicle without having to alight, merely by actuating a hydraulic motor in forward or reverse direction.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 3 is an enlarged rear elevational view of the swather when in field configuration.

FIG. 4 is an enlarged plan view of the swather and hitch.

FIG. 5 is a plan view of the hitch showing its different positions of adjustment.

FIG. 6 is a sectional view on line 6—6 of FIG. 3.

FIG. 7 is a view similar to FIG. 6 showing a modification.

FIG. 8 is a diagram illustrating a hydraulic circuit embodied in the apparatus.

FIG. 9 is a rear elevational view of a modified swather in accordance with the invention.

FIG. 10 is a view similar to FIG. 9 of a further modified swather in accordance with the invention.

FIG. 11 is an enlarged view of part of the swather shown in FIG. 9.

FIG. 12 is a further enlarged sectional view on line 12—12 of FIG. 11.

FIG. 13 is an enlarged view of part of the swather shown in FIG. 10.

DESCRIPTION OF THE PREFERRED EMBODIMENT

Figure 1:
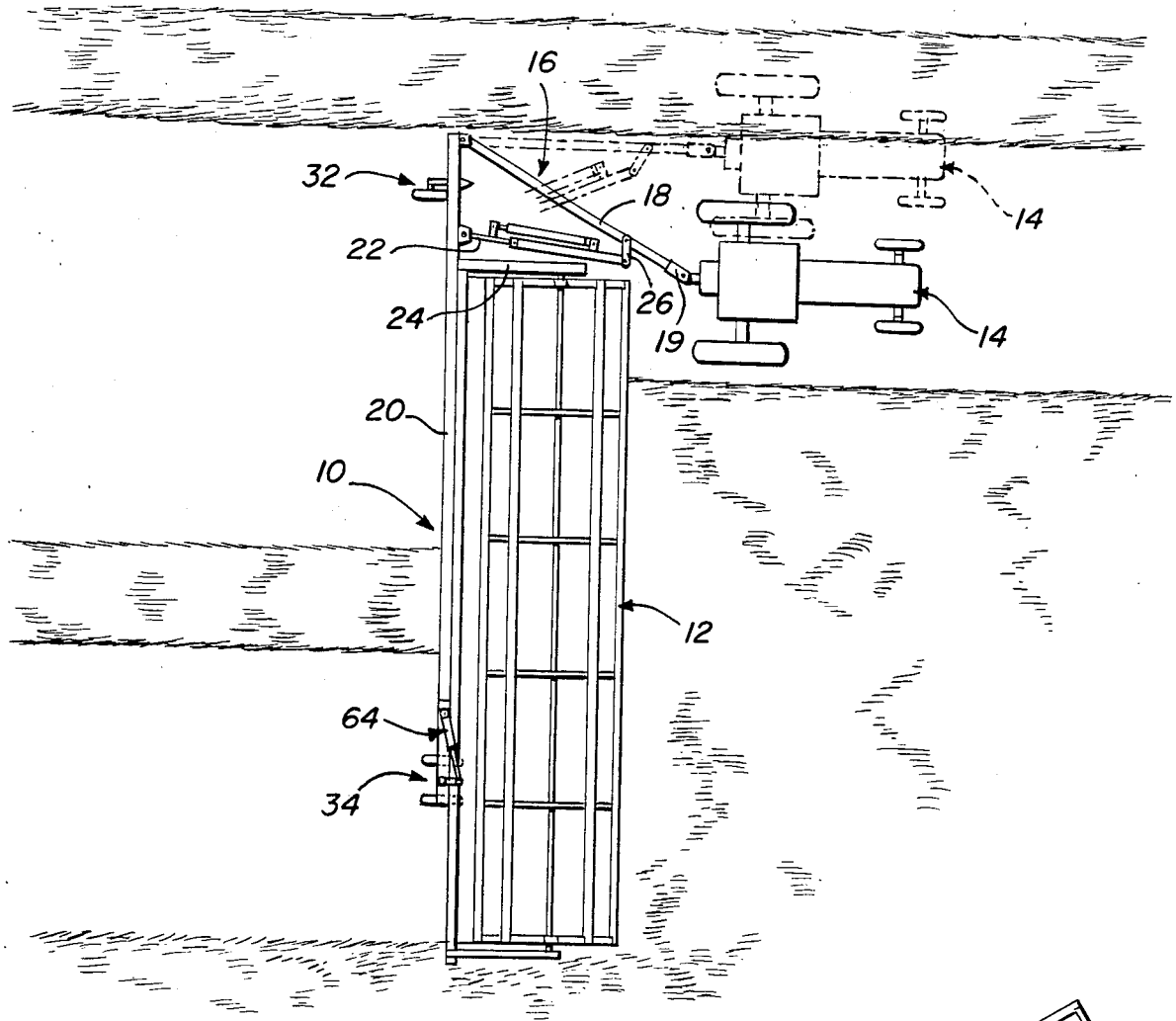
FIG. 1 is a plan view of a swather, tractor and hitch assembly in accordance with the invention shown in field configuration.
Figure 2:
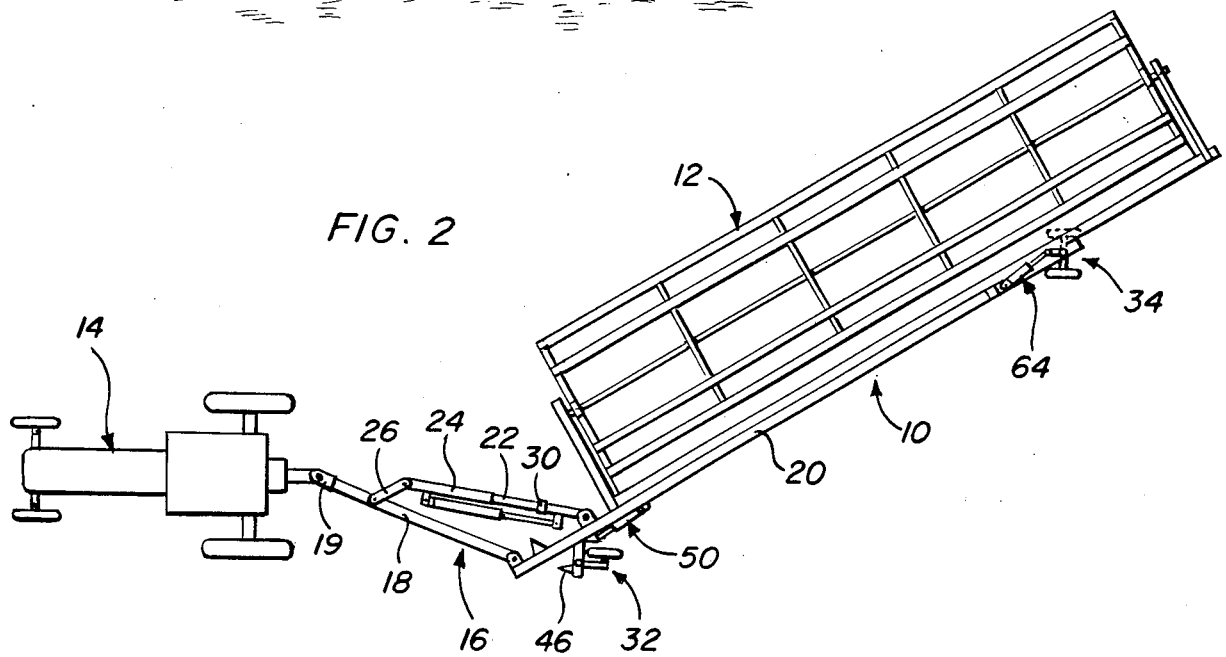
FIG. 2 is a view similar to FIG. 1 with the apparatus shown in a transport configuration.

Referring initially to FIGS. 1 and 2, there is illustrated a generally known form of agricultural pull-type swather 10 having a swather reel 12, a tractor 14 forming a towing vehicle, and a hitch assembly 16 for connecting the tractor to the swather. In accordance with the invention, the hitch assembly can be adjusted to change the relative positions of the tractor and swather as between field positions (FIG. 1) wherein the tractor pulls the swather straight ahead in a widthwise manner to form a swath in a crop growing field, and a transport position (FIG. 2) wherein the tractor pulls the swather substantially lengthwise for negotiating roads, farm gates and the like. Further, the apparatus may be adjusted as between a pair of field positions namely a field position for forming a narrow swath as shown in full line in FIG. 1, and a field position for forming a wide swath as shown in dotted line in FIG. 1.

Hitch assembly 16 includes an elongate hitch pole 18 pivotally connected at one end thereof to a post 21 at the outboard end of a main swather beam 20 and having a conventional connection 19 at its other end for hitching to tractor 14. Inboard of post 21, beam 20 has a further post 23 to which is pivotally connected one end of a telescopic tube assembly comprising telescopic tubes 22, 24, and the other or outer end of the telescopic tube assembly is connected to the hitch pole 18 through a pivotal link 26. A first hydraulic cylinder 28 is connected between tubes 22, 24 so that extension of the cylinder effects telescopic extension of the tubes, and retraction of the cylinder effects telescopic retraction of the tubes. Thus, when the cylinder is fully extended (position A in FIG. 5) the hitch assembly is in the transport configuration corresponding to FIG. 2, when the cylinder is fully retracted (position B in FIG. 5) the hitch assembly is in the narrow swath-cutting field configuration corresponding to the full-line position of FIG. 1 and when the cylinder is partially retracted (position C in FIG. 5) the hitch assembly is in the wide swath-cutting field configuration corresponding to the dotted-line position of FIG. 1. Further, to set the partially retracted position, male telescopic tube 22 may be provided with a stop collar 30 which can be selectively moved up and down tube 22 and releasably locked in place, for example by a pin fitting in suitably located holes in the tube. By this means, with a suitable number of holes along tube 22, the hitch could be set in a number of intermediate positions.

Swather 10 further includes a first wheel assembly 32 adjacent the outboard end of beam 20 and a second wheel assembly 34 adjacent the other end of the beam.

Wheel assembly 32 comprises a bracket having a horizontal limb 36 and a depending vertical limb 38. The vertical limb has hinge connections 40 with post 23 allowing the bracket to pivot about a vertical axis. Horizontal limb 36 of the bracket rotatably carries a shaft 42 on which is mounted a wheel 44. Shaft 42 also has fixed thereto a wedge-shaped latch element 46. Element 46 fits into a complimentary wedge-shaped latch receiving pocket 48 carried below beam 20. The longitudinal axis of wedge element 46 is perpendicular to the axis of rotation of wheel 44. Thus, when limb 36 is swung into alignment with beam 20, element 46 is received in pocket 48, shaft 42 is thereby prevented from rotating in limb 36, and wheel 44 is effectively locked in the straight-ahead position for field use, as shown in FIGS. 1 and 5. When, however, limb 36 is swung away from beam 20, wedge element 46 is released from pocket 48, shaft 42 is therefore free to rotate in limb 36, and wheel 44 is effectively free to caster, which facilitates steering of the swather in the transport configuration shown in FIG. 1 and in dotted line in FIG. 4. In order to swing limb 36 between the respective field and transport positions, a second hydraulic cylinder 50 is connected between limb 38 and a suitable part of the swather frame. When cylinder 50 is hydraulically extended, the bracket is swung into line with beam 20 engaging element 46 in pocket 48 and locking wheel 44. When cylinder 50 is retracted, limb 36 is swung away from beam 20, releasing member 46 from pocket 48 and allowing the wheel to caster.

In a modification, as shown in FIG. 7, shaft 42 has a hub 43 with a pair of caster wheels 44a, 44b in place of the single caster wheel 44 previously described.

The second wheel assembly 34 of the swather (see FIGS. 3 and 4) comprises a pair of wheels 52, 54 on a hub 56 at the base of a vertical shaft 58 journaled in a post 60 associated with beam 20. A link 62 at the top of the shaft connects the shaft to a third hydraulic cylinder 64 carried on the swather frame, the throw of which is such that when hydraulically extended, the wheels 52, 54 are swung into a straight ahead position required for the field configuration of the apparatus (and shown in full line in FIG. 4) and when hydraulically retracted, the wheels are swung into an inclined position required for the transport configuration of the apparatus, and shown in dotted line in FIG. 4.

Further in accordance with the invention, the first, second and third hydraulic cylinders 28, 50 and 64, are connected in series in a hydraulic circuit formed by suitable connections 66, 68, 70, 72 (FIG. 7) respectively connecting the tail end of cylinder 28 to the head end of cylinder 50, the head end of cylinder 50 to the head end of cylinder 64, the tail end of cylinder 64 to the tail end of cylinder 50 and the tail end of cylinder 50 to the head end of cylinder 28. These connections are effective to provide least-resistance sequence operation of the cylinders to convert the swather and hitch assembly as between the respective field and transport positions, as described below, when the circuit is connected, as by hoses 74, 76 to a suitable source of hydraulic power such as a hydraulic motor of tractor 14.

When the apparatus is to be converted from transport to field configuration, with cylinder 28 fully extended and cylinders 50 and 64 each retracted, the hydraulic motor is operated in a direction supplying pressure fluid to the circuit through hose 74 and delivering fluid from the circuit through hose 76. Cylinder 50 which controls wheel assembly 32 has the least resistance to movement and is therefore extended first, swinging element 46 into pocket 48 and locking wheel 44 (or wheels 44a, 44b) in the straight ahead position. Then, cylinder 64 is extended bringing wheels 52, 54 around from their inclined transport position to their straight ahead field position. Finally, cylinder 28 will be retracted causing the entire swather to swing about from the transport configuration into one or other of the field configurations depending on whether collar 30 is being used.

Conversely, when the apparatus is to be converted from the field position to the transport position, the hydraulic motor is operated in reverse, supplying pressure fluid through the circuit through hose 76 and delivering fluid from the circuit through hose 74. Initially, cylinder 28 will be extended, thereby extending the telescopic tubes 22, 24, pushing the distal end of the swather backwards into the transport configuration. When cylinder 28 is fully extended, cylinder 64 is retracted, moving wheels 52, 54 into the inclined transport position. Finally, cylinder 50 will retract, swinging element 46 out of pocket 48 thereby freeing wheel 44 for castering during road transport.

It will be appreciated that conversion of the swather as between its respective field and transport configurations can be effected, either way, with minimun effort, merely by means of a single hydraulic motor control which can be operated by the tractor driver from the tractor seat.

Also shown in the drawings are conventional drive components for the swather reel, such as a drive shaft 80, shaft housing 82, and gear box 84.

FIGS. 9–13 show modifications of the invention applicable to swathers in which wheel assembly 34' at the end of beam 20 remote from the hitch assembly has wheels 86, 88 (or a single wheel) on a depending post 90, which wheels are fixed with their axes parallel beam 20, i.e. so as to run only in the field configuration of the swather. To adapt a swather of this type to a conversion system in accordance with the invention, the swather may be provided with a third wheel assembly 92 or 92' adjacent assembly 34' for use in the transport configuration of the swather and which is actuated by cylinder 64, so as to be inoperative when the swather is in field configuration, whereby the swather uses wheels 86, 88, and so as to be operative and take over from wheels 86, 88 when the swather is converted to the transport configuration.

In the embodiment illustrated in FIGS. 9, 11 and 12, assembly 92 comprises a depending arm 94 pivotally connected to beam 20 by a pivot connection 96, the arm having a wheel 98 (or wheels) at its lower end on an axis angled relative to beam 20 so as to be suitable for towing the swather in the transport configuration. Cylinder 64 is in this case connected between beam 20 and arm 94 so as to raise the arm when the swather is brought into field position (as previously described), cylinder 64 being connected in the hydraulic circuit in similar manner to that previously described except that it is reversed so as to be extended in the transport position and retracted in the field position so as to lift wheel 98 out of ground engagement whereby the swather runs on wheels 86, 88. When the swather is converted to transport configuration, however, (as previously described) cylinder 64 lowers arm 94 bringing wheel 98 into ground engagement and slightly lifting wheels 86, 88, so that the swather runs on wheel 98.

In the embodiment illustrated in FIGS. 10 and 13, assembly 92' comprises a telescopic arm 100 in a tube 102 depending from beam 20, with a wheel 104 (or wheels) at the bottom of arm 100 again at a suitable angle for running in the transport configuration of the apparatus. Cylinder 64 is in this case connected between a bracket 106 on the beam and a collar 108 on arm 100.

It will be understood that cylinder 64 raises wheel 104 out of ground engagement when the swather is in field configuration and lowers wheel 104 into ground engagement when the swather is converted to transport configuration in similar manner to the previous embodiment.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A pull-type agricultural implement such as a swather having an elongate frame mounting a power-driven work member, such as a swather reel, a movable first wheel assembly adjacent one end of the frame, a movable second wheel assembly adjacent the other end of the frame, an adjustable hitch assembly at said one end of the frame for changing the configuration of the implement in relation to a towing vehicle as between a working field position wherein the implement is pulled in a direction substantially perpendicular to the length of the frame, and a transport position wherein the implement is pulled in a substantially lengthwise direction, and power means for moving the respective wheel assemblies between field and transport positions, the hitch assembly comprising a hitch pole pivotally connected at one end of the pole to a part of the frame at said one end thereof, the hitch pole having means at its other end for connection to a towing vehicle, a telescoping assembly pivotally interconnected between the frame and the hitch pole, a first hydraulic cylinder for providing telescopic extending and retracting movements of the telescoping assembly effective to adjust the angle of the hitch pole relative to the frame as between field and transport positions, the power means comprising a second hydraulic cylinder for moving the first wheel assembly between the field and transport positions, and a third hydraulic cylinder for moving the second wheel assembly between the field and transport positions, said first wheel assembly comprising a castering wheel and locking means for preventing the wheel from castering when in the field position, said castering wheel comprising a bracket mounted for pivotal movement on the frame under control of the second cylinder, a wheel-carrying shaft rotatably mounted in the bracket, said locking means comprising a latch element on the shaft, and a complimentary latch element on the frame, the respective latch elements interengaging when the bracket is pivoted to field position to hold the shaft against rotation, and the elements disengaging when the bracket is pivoted to transport position to allow rotation of the shaft and castering of the wheel.

2. The invention of claim 1 wherein the first, second and third hydraulic cylinders are connected in series in a hydraulic circuit for operation in low-resistance sequence when converting the implement as between respective field and transport configurations.

3. The invention of claim 2 wherein the first hydraulic cylinder is extended in the transport configuration of the implement and retracted in the field configuration of the implement while the second and third cylinders are each retracted in the transport configuration of the implement and extended in the field configuration, wherein the tail end of the first cylinder is connected in circuit to the head end of the second cylinder, the head end of the second cylinder is connected to the head end of the third cylinder, the tail end of the third cylinder is connected to the tail end of the second cylinder, the tail end of the second cylinder is connected to the head end of the first cylinder, the head and tail ends of the first cylinder also having means for connecting same to a reversible source of pressurized hydraulic fluid.

4. The invention of claim 1 wherein the respective latch elements comprise a wedge-shaped element on the shaft and a wedge-shaped pocket on the frame for receiving the latch element on the shaft.

5. The invention of claim 1 wherein the telescoping assembly comprises a pair of telescopically interconnected tubes and the first cylinder is connected to the respective tubes.

6. The invention of claim 1 wherein the telescoping assembly has a fully extended position defining the transport configuration of the apparatus, a fully retracted position defining the field configuration, and an intermediate position defining a further field configuration, the assembly further including selectively setable means for preventing retraction of the assembly beyond the intermediate position.

7. The invention of claim 6 wherein the telescopic assembly comprises telescopically interconnected male and female tubes, and the selectively setable means comprises a movable and lockable stop collar on the male tube.

8. The invention of claim 1 wherein the second wheel assembly comprises a pivotal wheel assembly having wheel means movable from a field position alignment to a transport position alignment by operation of the third hydraulic cylinder.

9. The invention of claim 1 wherein the second wheel assembly comprises a vertically movable wheel movable by the third hydraulic cylinder into ground engagement in the transport position of the implement and out of ground engagement in the field position of the implement and at least one non-movable wheel fixed in field position alignment for use when the vertically movable wheel is out of ground engagement and which is lifted clear of the ground when the vertically movable wheel is moved into ground engagement by the third hydraulic cylinder.

10. The invention of claim 9 wherein the vertically movable wheel comprises a wheel-mounting arm pivotally suspended from the frame and the third hydraulic cylinder is connected between the frame and said arm.

11. The invention of claim 9 wherein the vertically movable wheel comprises a wheel-mounting arm telescopically suspended from the frame and the third hydraulic cylinder is connected between the frame and said arm.

* * * * *